Sept. 2, 1930.   E. HAMWI   1,775,026
CONE TRIMMING MACHINE
Filed Nov. 9, 1929   4 Sheets-Sheet 1

Inventor:
Ernest Hamwi,
by Kipsey & Kingsland
His Attorneys.

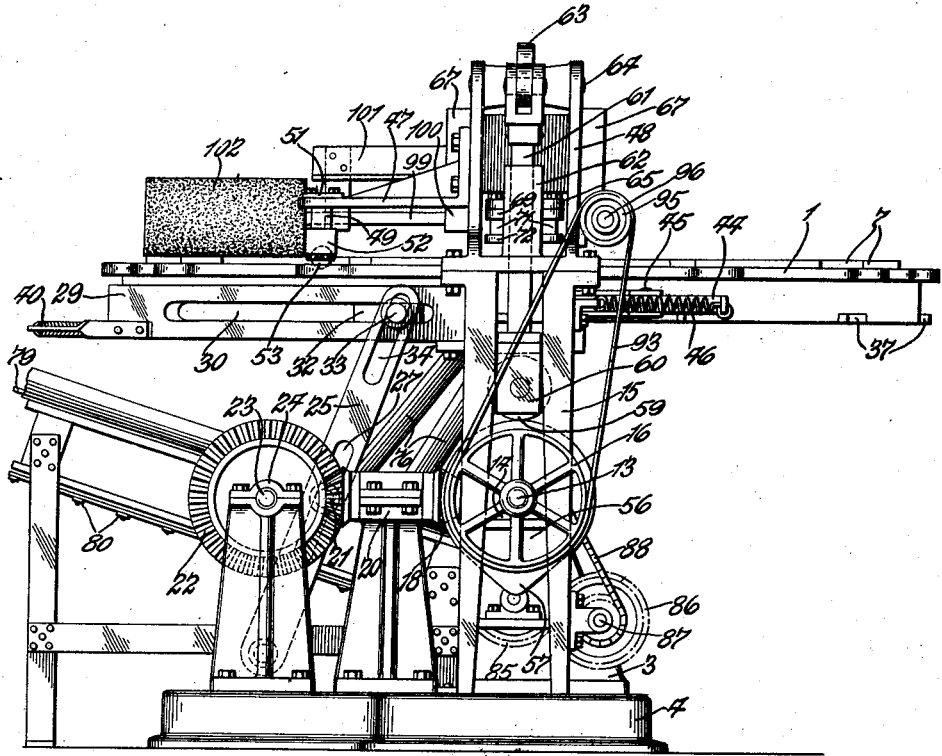
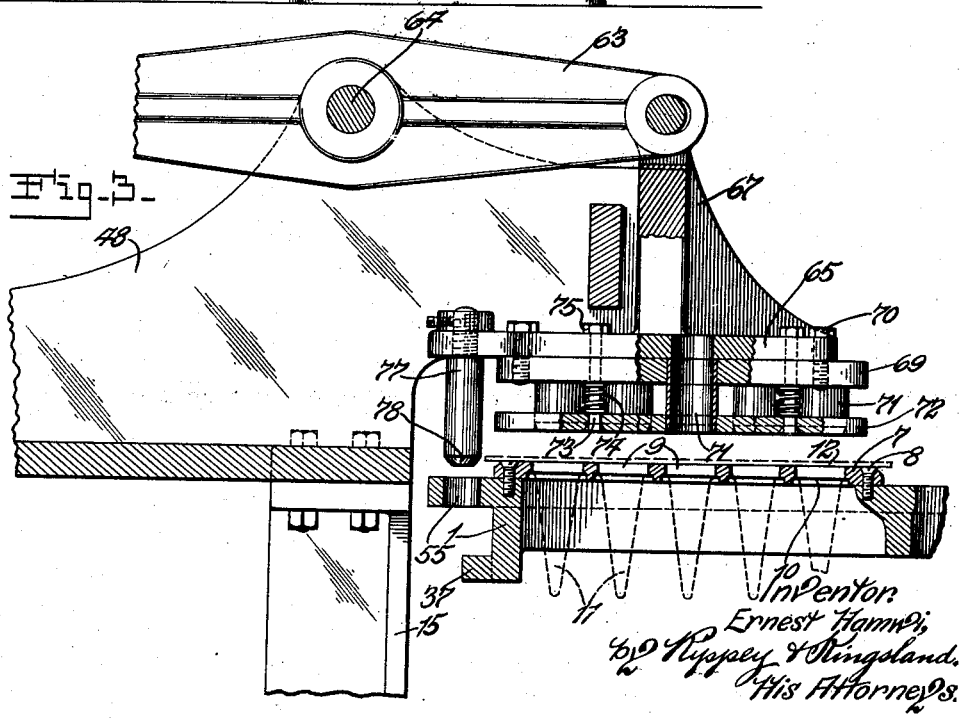

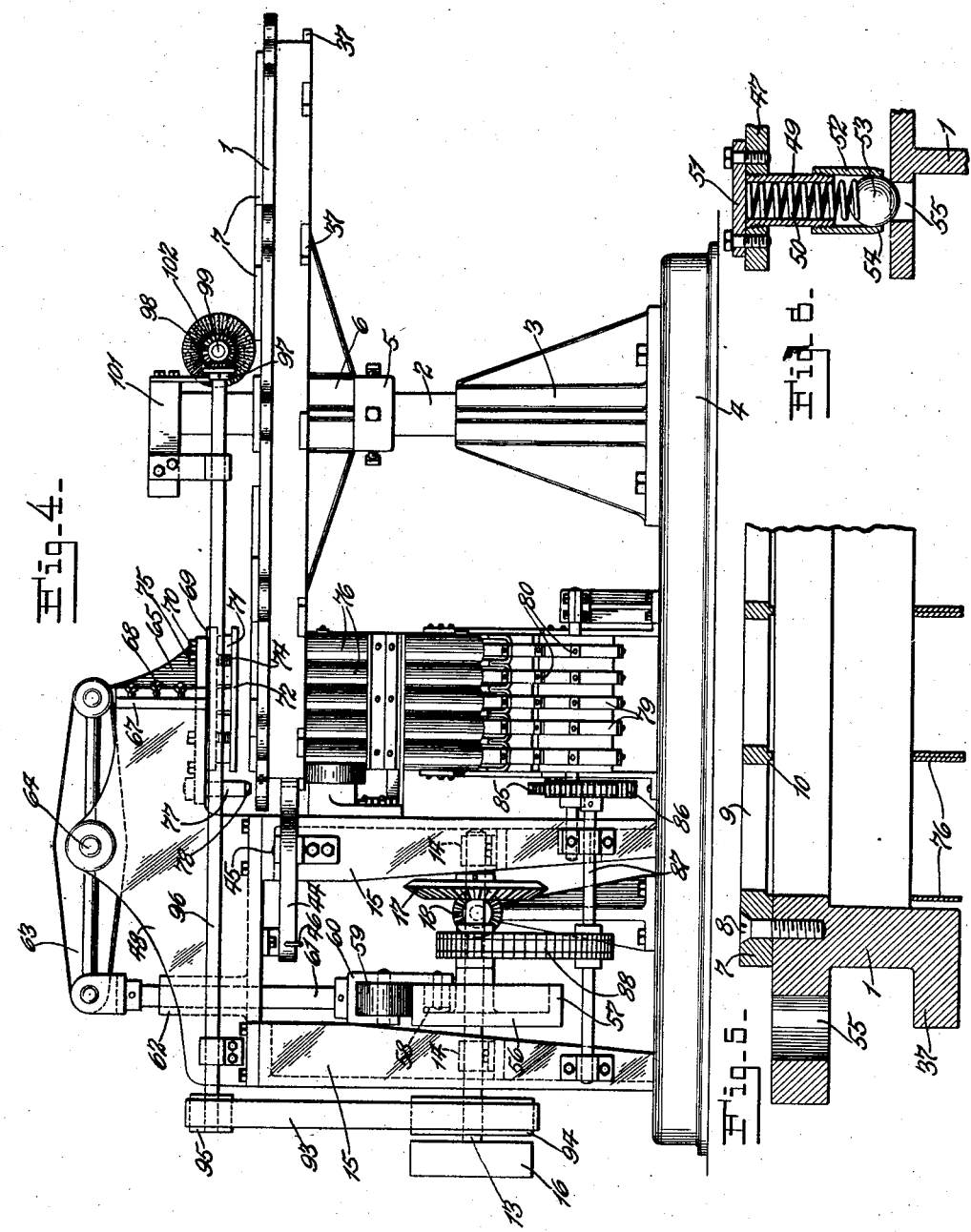

Sept. 2, 1930.   E. HAMWI   1,775,026
CONE TRIMMING MACHINE
Filed Nov. 9, 1929   4 Sheets-Sheet 4
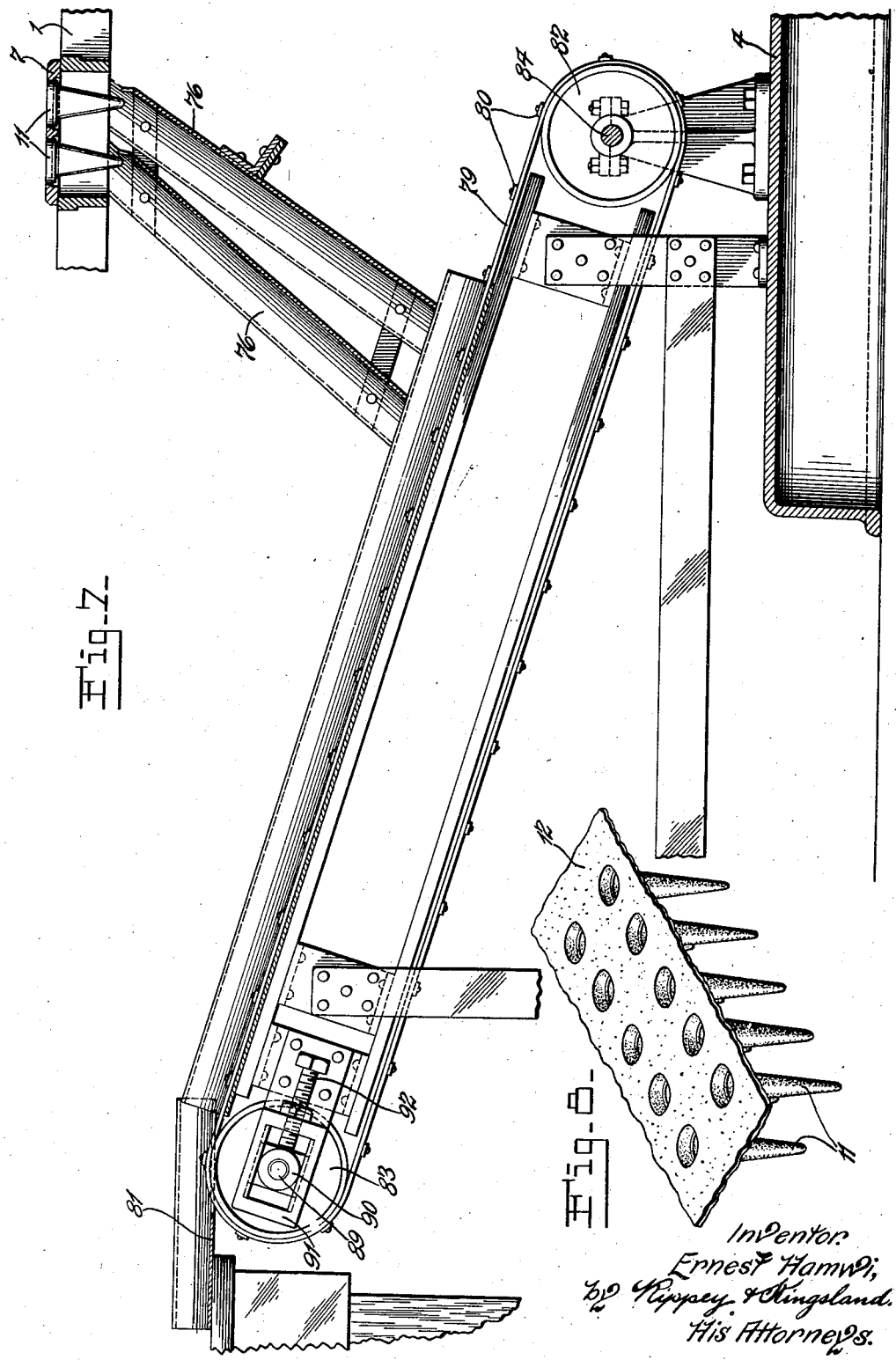

Patented Sept. 2, 1930

1,775,026

UNITED STATES PATENT OFFICE

ERNEST HAMWI, OF ST. LOUIS, MISSOURI

CONE-TRIMMING MACHINE

Application filed November 9, 1929. Serial No. 405,862.

This invention relates to cone trimming machines; and an object is to provide a machine capable of operation to trim the irregularities from the upper or open ends of ice cream cones and similar edible containers so as to form smooth and regular edges at the upper ends of the cones or containers.

Another object of the invention is to provide a machine wherein the assembly of a series of integrally united cones can be mounted and the machine operated to remove the surplus material from the open or upper ends of the cones and to discharge the cones to a conveyor by which the cones are transferred or carried from the machine.

Another object of the invention is to provide an improved machine for cutting the surplus material from the upper or open ends of ice cream cones or containers so as to provide and to form smooth edges.

Another object of the invention is to provide improved centering or locating means for cooperating with the cone carrier in order to bring the parts of the machine into proper relationship for operation of the cutting devices by which the surplus material is cut and removed from the cones and by which the cones are ejected from the carrier.

Another object of the invention is to provide means for removing and discharging from the machine the waste material that is cut or removed from the cones.

Another object of the invention is to provide an improved machine for cutting and treating ice cream cones or other containers in order to produce and form thereon smooth edges around the open ends of the cones or containers, and embodying other and advantageous features and elements herein disclosed, reference being made to the accompanying drawings, in which—

Fig. 1 is a plan view of my improved machine.

Fig. 1ᵃ is a detail view showing the actuator by which the cone carrier is moved and the stop by which extent of movement by the actuator is limited.

Fig. 2 is an end elevation of the machine.

Fig. 3 is an enlarged detail view with parts in section showing the mechanism by which the surplus and excess material is cut and removed from the cones and whereby the cones are discharged and ejected from the carrier.

Fig. 4 is a side elevation of the machine.

Fig. 5 is an enlarged sectional detail of a part of the cone carrier.

Fig. 6 is an enlarged detail sectional view of a latch device whereby the cone carrier is held from accidental rotation.

Fig. 7 is an enlarged sectional view of the conveyer and the chutes or passages for conducting the cones from the cone carrier to the conveyor.

Fig. 8 is a plan view showing a series of baked cones integrally united with baked surplus material at the open ends of said cones.

Figure 1:
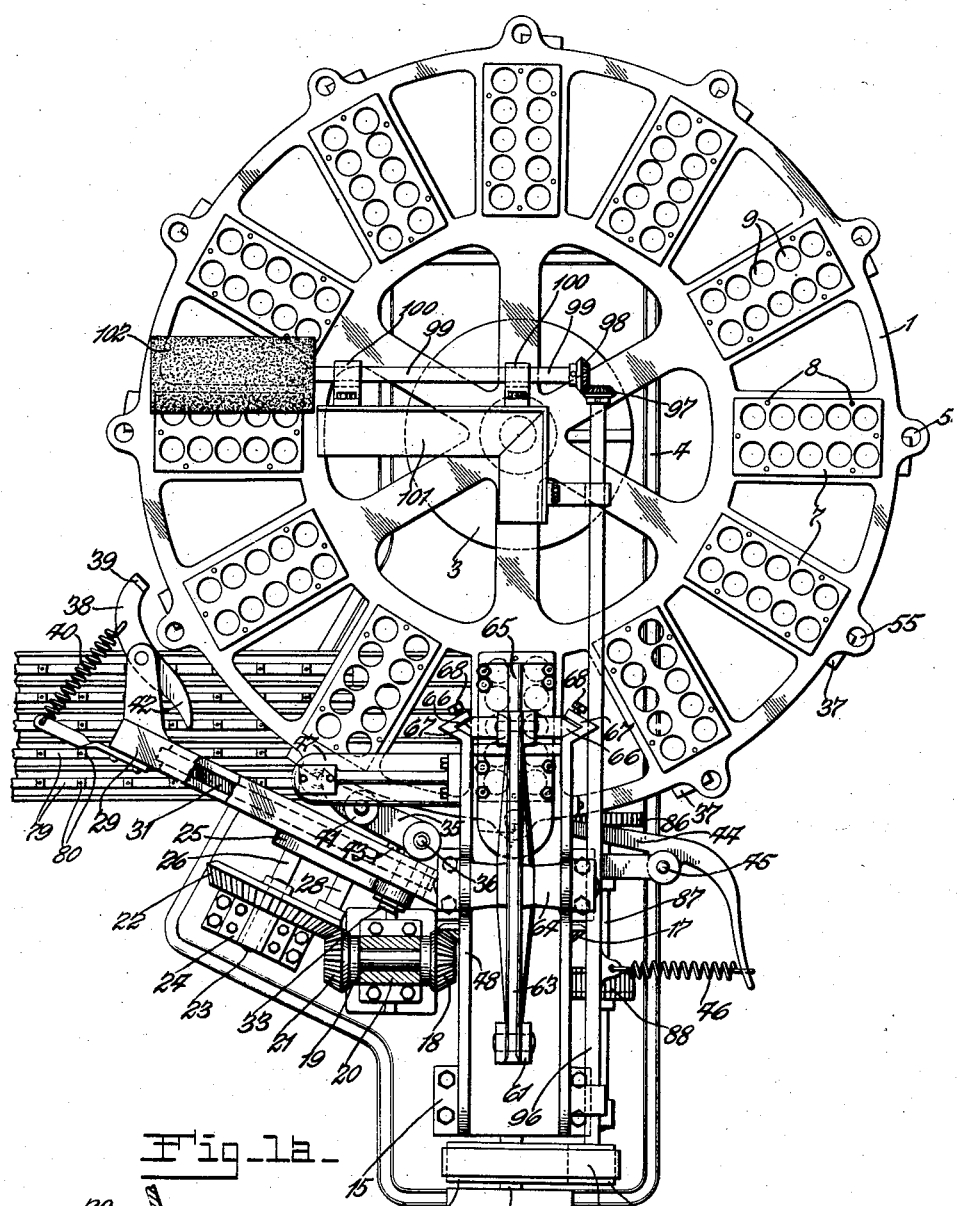
Figure 1A:
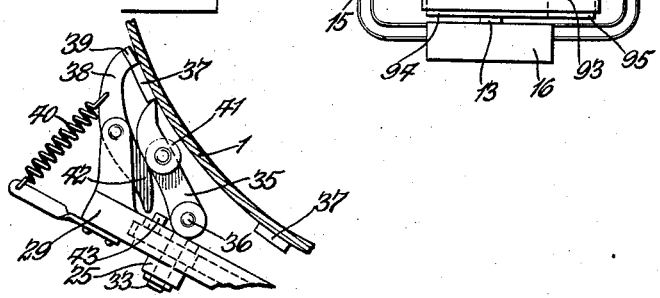

In the embodiment of the invention shown, the cone carrier is a support comprising a frame 1. This frame 1 is circular and is mounted for rotation about a vertical axis. In the present arrangement, the circular supporting frame is mounted for rotation on the upper end of a vertical shaft 2. The lower end of the shaft 2 is engaged in a support 3 (Fig. 4) rigid on a base 4. The collar 5 attached to the upper portion of the shaft 2 serves to support the circular rotary supporting frame 1 for rotation about the shaft 2. It is clear that this arrangement may be varied and that the shaft may be rotated with the frame or that the frame may be rotated about the shaft as an axis while the shaft remains stationary. The frame 1 has a hub 6 which is mounted on the upper end of the shaft 2.

The rotary cone supporting frame 1 has attached to its upper side an annular series of cone supporting plates 7. These plates are removable and replaceable, being held rigid on the frame by removable screws 8 or other appropriate fasteners. Each of the plates 7 is formed with one or more series of holes 9 through which the cones extend and in which the cones are supported preparatory to and during their treatment by this machine. After being treated, the cones are ejected downwardly through the holes 9 and are guided to appropriate conveyors by which they are removed from the machine, as hereinafter explained. The plates 7 have undercut grooves 10 in their under sides. These grooves 10 surround the respective holes 9 and constitute enlargement of the holes so as to prevent the cones from being frictionally held when it is time for the cones to be discharged from the machines.

Ice cream cones and similar edible containers are usually composed of baked farinaceous substance. The cones, etc., are formed and shaped in molds and are baked while in the molds. The farinaceous substance is poured into the molds in a sufficient amount to overflow so that when the cones, etc., are baked, they are united with the baked overflow substance at the upper ends of the cones, etc., thus in many cases integrally uniting a considerable number of the baked cones, etc. The overflow baked substance at the upper edges of the cones should be removed and the cones should be provided with smooth upper edges. This machine operates to perform these functions.

In Fig. 8 of the drawing, I have shown the form in which the baked cones, etc., sometimes come from the molds. As there shown, the various cones 11 are integrally united at their upper ends by the overflow material 12, which may or may not become broken when the cones are removed from the molds. In using the present invention, the series of cones 11 are projected downwardly through the holes 9 seating the overflow material or flange 12 on the upper surface of the plates 7 and thereby supporting the cones in about the relationship indicated by the dotted lines 3. The present machine operates to cut excess or waste portions 12 from the upper edges of the cones, etc., or to form smooth edges at the open ends of the cones, etc., and then to discharge the cones, etc. from the supporting plates 7.

A drive shaft 13 is journaled for rotation in appropriate bearings 14 supported by spaced frames 15 mounted rigidly on the base 4. The shaft 13 may be rotated by any appropriate driving connection, including a pulley 16, or other appropriate means. The shaft 13 has attached thereto a gear wheel 17 which meshes with a pinion 18 attached to a shaft 19. The shaft 19 is rotative in a bearing 20 (Fig. 1) and has attached thereto a pinion 21 in mesh with a gear wheel 22 attached to a shaft 23 rotative in a bearing 24. Accordingly, the shaft 23 is constantly rotated when the shaft 13 is in rotation.

A lever 25 has its lower end connected with a pivot 26 and its intermediate portion formed with a long slot 27 into which projects a crank pin 28. The crank pin 28 is attached to the gear wheel 22 eccentrically of the axis of said gear wheel, so that when said gear wheel 22 is rotated, the lever 25 will be oscillated.

One of the frames 15 rigidly supports an arm 29 in which is an elongated slot 30 formed with slots 31 in its upper and lower walls. A block 32 is mounted for sliding movements in the slot 30 and engages in the grooves 31 and has an arm 33 projecting through the slot 30 and into a slot 34 in the upper end of the lever 25. Accordingly, when the gear wheel 22 is rotated, the lever 25 is oscillated and the block 32 is moved back and forth along the arm 29.

A pawl 35 is mounted on a vertical pivot 36 in connection with the inner end of the block 32 and is arranged to engage with the rear ends of abutments 37 formed integral or rigid with the rotary frame 1. Thus, when the pawl 35 is near the inner end of the arm 29, it is always engaged with or is adjacent to the rear shoulder of one of the projections 37; so that when the upper end of the lever 25 is swung outwardly by rotation of the gear wheel 22 and the block 32 is thereby moved outwardly toward the outer end of the arm 29, said pawl 35 will turn the frame 1 about the same distance that the pawl moves. This distance is approximately the same as the distance between the radii of adjacent plates 7.

Overthrow or excess movement of the frame 1 is prevented by a stop or control device provided for that purpose. The stop or control device shown comprises an arm 38 pivotally supported by the outer end of the arm 29 and having an end 39 normally held retracted from the frame 1 by a spring 40 (Fig. 1). At the proper time during outward movement of the pawl 35, a roller 41 on said pawl engages the tail 42 of the arm 38 and moves said arm 38 in opposition to the spring 40, so as to place the end 39 of said arm 38 in front of the forward shoulder of the projection 37 with which the pawl 35 is engaged. Thereby, excess or overthrow movement of the frame 1 will be prevented and said frame will be stopped and positively prevented from further movement until the end 39 of the arm 38 is moved out of the path of the projection 37.

The operations are timed so that the pawl 35 begins its return movement when the end 39 of the arm 38 is engaged by the projection 37. Accordingly, no forward pressure is exerted by the pawl 35 after the projection 37 is engaged by the arms 38, but the pawl 35 immediately begins its return movement. The return movement of the pawl 35 causes the end of said pawl to slide over and beyond the projection 37 next rearwardly from the projection 37 which said pawl 35 had engaged during forward turning movement of the frame 1. The pawl 35 is carried rearwardly beyond the projection 37 until the forward end of the said pawl 35 is behind the rear end of said projection 37 ready for another forward movement to turn the frame 1 forwardly an additional step. After the pawl 35 passes beyond or to the rear of the projection 37, which is to be engaged by said pawl for the next forward turning movement of the frame 1, said pawl is pressed inwardly toward the frame 1 by a spring actuated bolt 43 supported by the block 32.

A brake comprising a lever 44 is pivoted on a support 45 and is actuated by a spring 46 to press the free end of said brake against the peripheral surface of the frame 1, so as to engage behind the respective projections 37. This brake 44 snaps behind the projections 37 in each of the stopping positions of the frame 1 and prevents backward turning movement of said frame 1, so as to permit the pawl 35 to ride over the projections 37, as above described, without displacing or turning backwardly the frame 1. The brake 44 does not interfere with the forward turning of the frame 1 by the pawl 35.

The frame 1 is stopped and centered accurately in its different stopping positions by a device provided for that purpose. An arm 47 is attached to a frame 48, which is rigid with the upper ends of the frames 15. A spring barrel 49 is attached to and projects downwardly from the arm 47 and encloses a coil spring 50 (Fig. 6). The upper end of the spring 50 bears against an abutment 51 attached to the arm 47.

A cage 52 is screwed on the lower end of the spring barrel 49 and encloses a ball 53. The ball 53 is supported within the cage by the restricted mouth 54 at the lower end of the cage 52, which prevents the ball from passing entirely out of the cage but permits the lower peripheral portion of the ball to project downwardly below the lower end of the cage, as will be seen in Fig. 6 of the drawing. The spring 50 presses the ball 53 downwardly, but permits the ball to be forced upwardly into the cage. In the stopped positions of the frame 1, the ball 53 engages in holes 55 formed around the edge of the frame 1. Thus, the ball 53, due to its rounded shape and due to the pressure of the spring 50, will center the frame 1 and will latch said frame in its centered position. That is to say, the ball 53 will latch and hold the frame 1 in almost exactly the same positions every time the respective holes 55 are brought into latching relationship with the ball 53.

The shaft 13 has attached thereto an eccentric cam comprising a wheel 56 having a cam flange 57 engaged on its inner periphery by a roller 58 and on its outer periphery by a roller 59. The rollers 58 and 59 are rotatably supported by a bracket 60 attached to the inner end of a rod 61 operative through a guide 62. The rod 61 extends for sliding movements through the guide 62 and has its upper end pivoted to the outer end of a rocker arm 63 mounted for rocking movement on a support 64 carried by the frame 48. The inner end of the rocker arm 63 pivotally supports a depending frame 65, which constitutes a support and actuator for the cutting and ejecting devices. The frame 65 is guided vertically between side portions of the frame 48. For guiding the frame 65 vertically, the sides of said frame are provided with beveled edges 66 (Fig. 1) engaging in correspondingly shaped grooves 67 in the side members of the frame 48. Screws 68 are screwed to the walls of the grooves 67 for adjustment to cooperate with the pointed sides 66 to form a perfect guide therefor.

A plate 69 is detachably secured to the under side of the frame 65 by fasteners 70. This plate 69 has attached thereto series of downwardly extending cutters and ejectors for cutting the surplus material 12 from the upper ends of the cones, etc. 11 so as to form smooth upper edges on the cones, etc., and eject the cones etc. from the holes 9 in which they are mounted. Each of said cutters and ejectors comprises a tube 71 having its outer periphery beveled at its lower end. These tubes 71 are of approximately the same diameter as the holes 9 so that when the frame 65 is moved downwardly, said tubes 71 may extend into the holes 9 a sufficient distance to eject the cones, etc. therefrom. These tubes 71 project through holes in a plate 72 attached to the lower ends of and supported by stems 73, which project upwardly for sliding movements through the plate 69 and through the frame 65. Springs 74 encircle the stems 73 between the plates 69 and 72 and actuate said plate 72 downwardly so that the lower surface of said plate 72 is approximately even with the lower ends of the tubes 71, or perhaps a slight distance below the lower ends of said tubes 71. Extent of downward movement of the plate 72 by the springs 74 is limited by heads 75 on the upper ends of the stems 73 and which seat upon and abut against the upper side of the frame 65.

It is now clear that when the shaft 13 is rotated, the cam 56—57 is rotated by said shaft and that the rocker arm 63 is rocked by the connections shown and described. The rocking of the arm 63 alternately raises and lowers the cutters and ejectors 71. When the ejectors 71 are lowered, they are moved downwardly a distance sufficient to seat the plate 72 upon the waste portion 12 of the cones, etc., and to cause the frame 65 to move downwardly a further distance in opposition to the springs 74. The further distance to which the frame 65 is moved downwardly is sufficient to eject the cutters 71 into the holes 9, thereby cutting and removing from the upper ends of the cones, etc. the waste material 12 and also forcing the cones, etc. downwardly below the upper walls of the grooves 10 so that there is no further support for said cones, etc. The cones, etc. are thereupon released and dropped by gravity into inclined chutes 76.

It is important that the carrier frame 1 be positively positioned so that the holes 8 are in exact alinement with the respective cutters and ejectors 71. It is possible that the ball 53 may for some reason fail to effect such positive alinement. Such failure of alinement would result if any foreign substance or body became lodged in any of the holes 55, or if any foreign substance adhered to the periphery of the ball 53. In order positively to aline the holes 9 with the cutters and ejectors 71, I provide an arm 77 in connection with the frame 65. This arm 77 is rigidly secured to the frame 65 and has a beveled lower end 78 in order readily to enter any of the holes 55. When the frame 65 descends, the arm 77 is projected into and through an adjacent hole 55 in the frame 1 and this action positively alines the holes 9 with the cutters and ejectors 71. So long as the arm 77 remains in the holes 55, it is impossible to turn the frame 1. This action of the rocker arm 63 for operating the cutters and ejectors 71 is arranged and timed to take place during the return movement of the pawl 35 to its initial or starting position after having turned the frame 1 a single step, as previously described. And the operation of the pawl 35 to turn the frame 1 is timed to occur while the frame 65 is in its up position, so that the parts 71 and 77 will not interfere with the turning of said frame 1.

The chutes 76 are inclined downwardly and laterally, so as to discharge the cones, etc. 11 onto endless conveyor belts 79. These conveyor belts 39 are equipped with spaced cleats 80 to engage against the ends of the cones, etc. and assure that the cones will be moved along with the belts. For, as shown, the conveyors 79 operate upwardly at an inclination and discharge the cones, etc. onto a platform or table 81. Because of the inclination of the conveyors upwardly, the open ends of the cones etc. are downwardly so that when the cones, etc. are discharged from the conveyors, said cones, etc. are telescoped one within the other automatically and as an incident to the discharge of the cones, etc. onto the table 81. These conveyor belts 79 are mounted on a lower roll 82 and an upper roll 83. The lower roll 82 is attached to a shaft 84. A gear wheel 85 of the shaft 84 meshes with a gear wheel 86 on a shaft 87 (Fig. 4). The shaft 87 is driven by a sprocket chain connection 88 operated by the shaft 13. The roll 83 is mounted on a shaft 89 in bearings 90. The bearings 90 are supported in frames 91 and are adjustable therein by screws 92, so as to tighten the conveyor belts 79.

A belt 93 engages a pulley 94 on the shaft 13 and a pulley 95 on a shaft 96. The shaft 96 has attached thereto a pinion 97 meshing with a pinion 98 on one end of a shaft 99 that is journaled for rotation in bearings 100. The bearings 100 are supported by a frame part 101 attached to the upper end of the stationary shaft 2. The outer end of the shaft 99 is equipped with a cylindrical brush 102 which is constantly rotated by the shaft 13, so as to brush from the plates 7 and from the carrier frame 1 the waste material 12 that is cut from the cones, etc. 11.

In operation, the cones, etc. 11 are placed in the holes 9 beyond or in advance of the brush 102. The shaft 13 is in constant rotation and, by the connections described, imparts step by step movements to the carrier frame 1. The series of cones, etc. are carried around by the frame 1 and said series of cones, etc. are successively positioned below the cutting and ejecting devices 71. These cutting and ejecting devices 71 are operated to act upon each series of cones, etc., the centering device 77 positively positioning the carrier frame for proper operation of the cutters and ejectors. The cutters and ejectors break and cut from the upper ends of the cones, etc. the waste material 12 and eject the cones through the holes 9 into the chutes 76. The cones, etc. move through the chutes 76 onto the conveyors 79 and are discharged therefrom and telescoped one within the other on the table 81. The actuating device 35 is operated, as above described, to impart step by step turning movements to the carrier frame 1, which is stopped approximately in the desired positions by the stopping abutment 39. Back throw or backward turning movement of the frame 1 is prevented by the brake device 44. Accurate centering for the frame 1 is approximately obtained by the latch ball 53 and is positively and accurately obtained by the device 77. Automatically and as an incident to the operation of the frame 1, the brush 102 turns and discharges therefrom the waste material 12.

It is now apparent that my invention obtains all of its intended objects in a most efficient and satisfactory manner. The construction, arangement and relationship of the elements forming the combinations of elements in this machine may be varied widely within the scope of equivalent limits without departure from the nature and principle of the invention.

I do not restrict myself unessentially, but what I claim and desire to secure by Letters Patent is:

1. A machine of the character described comprising a support for supporting ice cream cones and the like and having holes through which said cones and the like extend, and mechanism for rotating said support about an upwardly extending axis, in combination with mechanism for cutting and smoothing the open ends of the cones and the like and ejecting the cones and the like from said holes.

2. A machine of the character described comprising a rotary supporting frame having holes for receiving cones and the like that are supported by said frame, mechanism for rotating said frame about an upwardly extending axis, and mechanism for trimming and smoothing the edges of said cones and the like and discharging the cones and the like through said holes in said frame.

3. A machine of the character described comprising a support for supporting baked cones having excess material in connection with their open ends, devices for rotating said support about an upwardly extending axis, mechanism for removing the excess material from the open ends of the cones, and mechanism for telescoping the cones one within the other.

4. A machine of the character described comprising a rotary support for supporting baked cones having excess material in connection with their open ends, devices for rotating said support about an upwardly extending axis, cutters for cutting the excess material from the cones and for discharging the cones from the support, a stationary support, and mechanism for conveying the cones to and discharging the cones onto said stationary support in telescoping arrangement.

5. A machine of the character described comprising a rotary support for supporting baked ice cream cones having surplus material in connection with the open ends thereof, mechanism for rotating said support about an upwardly extending axis, devices for cutting the surplus material from the open ends of the ice cream cones, and means for operating said devices by said mechanism.

6. A machine of the character described comprising a rotary support for supporting baked ice cream cones having surplus material in connection with the open ends thereof, mechanism for rotating said support about an upwardly extending axis, devices for cutting the surplus material from the open ends of the ice cream cones, means for operating said devices by said mechanism and causing said devices to discharge the ice cream cones from said support, and mechanism for receiving and arranging the discharged ice cream cones in telescoping arrangement.

7. A machine of the character described comprising a rotary support for supporting baked ice cream cones having surplus material in connection with the open ends thereof, devices for cutting the surplus material from the open ends of the ice cream cones, mechanism for rotating said support about an upwardly extending axis to carry the ice cream cones in position for operation of said devices, and means for positively centering and adjusting said support in exact position for operation of said device.

8. A machine of the character described comprising a rotary support for supporting baked ice cream cones having surplus material in connection with the open ends thereof, devices for cutting the surplus material from the open ends of the ice cream cones, mechanism for rotating said support about an upwardly extending axis to carry the ice cream cones in position for operation of said devices, means for positively centering and adjusting said support in exact position for operation of said device, means for operating said devices to cut the surplus material from the cones and to discharge the cones from said support, and means for telescoping the cones one within the other.

9. A machine of the character described comprising a support for supporting cones having surplus material in connection with their open ends, means for rotating said support about an upwardly extending axis, mechanism for removing the surplus material from the open ends of the cones and for finishing and smoothing the open ends of the cones, and a movable conveyor for telescoping the cones one within the other.

10. A machine of the character described comprising a rotary support for supporting baked cones having surplus material in connection with their open ends, devices for removing the surplus material from the open ends of the cones and for forming smooth surfaces on the open ends of the cones, mechanism for moving said support intermittently about an upwardly extending axis to positions in which cones are supported in position for operation of said devices, and mechanism for operating said devices after said support has been positioned.

11. A machine of the character described comprising a rotary support for supporting baked cones having surplus material in connection with their open ends, devices for removing the surplus material from the open ends of the cones and for forming smooth surfaces on the open ends of the cones, mechanism for moving said support intermittently about an upwardly extending axis to positions in which cones are supported in position for operation of said devices, mechanism for operating said devices after said support has been positioned and preventing operation of said devices during movement of said support, and mechanism for arranging the cones in telescoping relationship.

12. A machine of the character described comprising a rotary support for supporting baked cones having surplus material in connection with their open ends, devices for removing the surplus material from the open ends of the baked cones, mechanism for rotating said support intermittently about an upwardly extending axis and stopping said support in positions in which cones are in position for operation of said devices, mechanism for operating said devices after said support has stopped in position for operation of said devices, and means for positively centering said support for operation of said devices.

13. A machine of the character described comprising a rotary support for supporting baked cones having surplus material in connection with their open ends, devices for removing the surplus material from the open ends of the baked cones, mechanism for rotating said support intermittently and about an upwardly extending axis stopping said support in positions in which cones are in position for operation of said devices, mechanism for operating said devices after said support has stopped in position for operation of said devices, means for positively centering said support for operation of said devices, and means for arranging the cones in telescoping relationship.

14. A machine of the character described comprising a rotary support for supporting baked cones having surplus material in connection with their open ends, mechanism for removing the surplus material from said cones and finishing and smoothing the ends of said cones, means for moving said support intermittently about an upwardly extending axis to positions for operation of said mechanism, devices for positively preventing dislocation of said support from position for operation of said mechanism, means for conveying the smoothed and finished cones from said support, and means for removing the waste material from said support.

15. A machine of the character described comprising a rotary support having holes therethrough for the reception of baked cones including surplus material arranged to seat upon said support to support said cones, devices for removing the surplus material from said cones and discharging the cones through said holes in said support, and means for rotating said support approximately horizontally about an upwardly extending axis to position for operation of said devices.

16. A machine of the character described comprising a rotary support having holes therethrough for the reception of baked cones including surplus material arranged to seat upon said support to support said cones, devices for removing the surplus material from said cones and discharging the cones through said holes in said support, means for rotating said support approximately horizontally about an upwardly extending axis to position for operation of said devices, and means for preventing movement of said support out of position for cooperation with said devices during operation of said devices.

17. A machine of the character described comprising a rotary support, mechanism for turning said support intermittently and step by step about an upwardly extending axis, means for stopping said support in stepped positions, means for preventing displacement of said support from the positions in which it is stopped, means for supporting on said support baked ice cream cones having surplus material in connection with the open ends thereof, and devices for removing the surplus material from the open ends of the ice cream cones and discharging the ice cream cones from said support in the stopped positions of said support.

18. A machine of the character described comprising a rotary support, mechanism for turning said support intermittently and step by step about an upwardly extending axis, means for stopping said support in stepped positions, means for preventing displacement of said support from the positions in which it is stopped, means for supporting on said support baked ice cream cones having surplus material in connection with the open ends thereof, devices for removing the surplus material from the open ends of the ice cream cones and discharging the ice cream cones from said support in the stopped positions of said support, and means for positively preventing movement of said support during operation of said devices.

19. A machine of the character described comprising a rotary support, means for supporting on said support baked cones having surplus material in connection with their open ends, devices for removing the surplus material from the open ends of the baked cones, and mechanism for rotating said support step by step about an upwardly extending axis to different successive positions for operation of said devices on baked cones carried by said support.

20. A machine of the character described comprising a rotary support, means for supporting on said support baked cones having surplus material in connection with their open ends, devices for removing the surplus material from the open ends of the baked cones, mechanism for rotating said support step by step about an upwardly extending axis to different successive positions for operation of said devices on baked cones carried by said support, and means for removing the baked cones from said support and arranging the cones in telescoping relationship.

21. A machine of the character described comprising a support for supporting ice cream cones and the like and having holes through which said cones and the like extend, means for supporting said support for rotation about an upwardly extending axis, means for imparting to said support step by step rotary movements about said axis, and mechanism for cutting and smoothing the open ends of the cones and the like ejecting the cones and the like downwardly through said holes in said support.

22. A machine of the character described comprising a rotary supporting frame, means for supporting and rotating said frame step by step about an upwardly extending axis, a series of plates attached to said frame having holes therethrough for receiving cones and the like that are supported by said plates, mechanism for trimming and smoothing the edges of said cones and the like about said plates and discharging the cones and the like downwardly through said holes in said plates, conveyors for receiving and conveying the cones and the like that are discharged through said holes in said plates, and means for guiding the cones and the like to the respective conveyors.

23. A machine of the character described comprising an upwardly extending axial member, a rotary supporting frame attached to said member for rotation about the upwardly extending axis of said member and having holes for receiving cones and the like that are supported by said frame, mechanism for rotating said frame step by step about said upwardly extending axis, a stop for stopping said frame in predetermined positions, means normally holding said stop out of engagement with said frame, means for causing a part of said mechanism to move said stop to position to engage said frame at each step by step movement of said frame by said mechanism, and devices for trimming and smoothing the edges of said cones and the like and discharging the cones and the like through said holes in said frame.

24. A machine of the character described comprising a support, means in connection with said support for supporting cones and the like having excess material in connection with their open ends, means for removing the excess material from the open ends of said cones and the like and forming smooth edges at the open ends of said cones and the like, and mechanism for rotating said support step by step about an upwardly extending axis to locate successive series of cones below and in position for operation of said last named means.

25. A machine of the character described comprising a support for supporting baked cones having excess material in connection with their open ends, mechanism for supporting and rotating said support step by step about an upwardly extending axis, means for removing the excess material from the open ends of said cones and forming smooth edges at the ends of said cones and discharging the cones downwardly through said support, means for guiding the respective cones that are discharged from said support, and a conveyor for receiving and conveying the cones from said guiding means.

26. A machine of the character described comprising a support for supporting baked cones having excess material in connection with their open ends, cutters for cutting the excess material from the cones and for discharging the cones from said support, mechanism for rotating said support step by step about an upwardly extending axis to position the cones below and in position for operation of said cutters, and means for stopping said support in exact position for operation of said cutters.

ERNEST HAMWI.